(No Model.)

C. C. GILMAN.
WATER FILTERING WELL OR RESERVOIR.

No. 341,650. Patented May 11, 1886.

Witnesses:
Henry Eickling
A. G. N. Vermilye

Inventor
Charles Carroll Gilman
by L. P. Fitch
his Atty.

UNITED STATES PATENT OFFICE.

CHARLES CARROLL GILMAN, OF ELDORA, IOWA.

WATER-FILTERING WELL OR RESERVOIR.

SPECIFICATION forming part of Letters Patent No. 341,650, dated May 11, 1886.

Application filed December 11, 1884. Serial No. 150,129. (No model.)

*To all whom it may concern:*

Be it known that I, CHARLES CARROLL GILMAN, of Eldora, in the county of Hardin and State of Iowa, and a citizen of the United States of America, have invented a new and useful Improvement in Filtering Water Wells and Reservoirs, of which the following is a specification, reference being had to the accompanying drawings, forming part of the same, in which—

Figure 1:
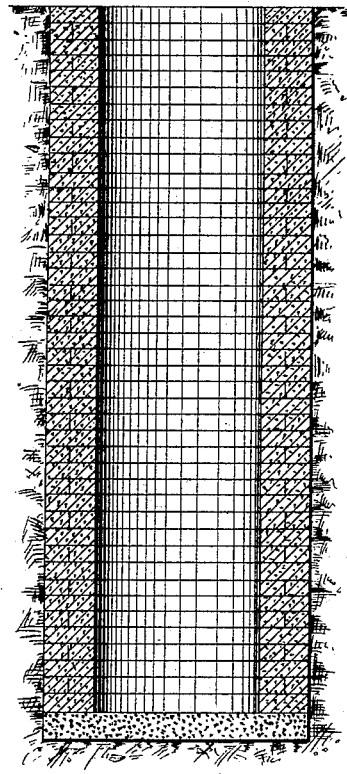
Figure 2:
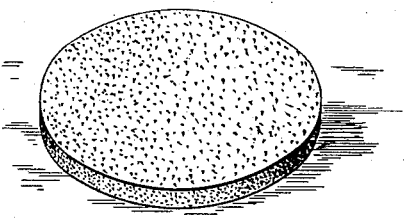
Figure 3:

Figure 1 is a vertical central section of a well containing my invention. Fig. 2 is a perspective view of the slab or plate of the solid filtering material which constitutes the bottom of said well; and Fig. 3 is a similar view of one of the blocks of such filtering material of which the walls of my well are constructed.

The object of my invention is to effect the filtering of the water, thus removing from it its impurities, during its passage into and its accumulation in wells in the ground. To accomplish this object I use as the material for the walls of wells porous terra-cotta or terra-cotta lumber. This material is made by mixing with the clay, in the process of its preparation for burning, sawdust or other comminuted combustible material, which in the burning of the terra-cotta is consumed, leaving the material minutely porous.

For the walls of open wells from which it is intended that the water shall be drawn or pumped in the usual way, the terra-cotta is sawed or otherwise shaped into suitable blocks to form the walls of the well in the ground when laid up one upon another. Fig. 3 represents a sample of such a block. The hole or shaft in the ground having been dug and water found, I lay a slab of the said terra-cotta (represented by Fig. 2) of suitable thickness—say from two to six inches—and of sufficient lateral dimensions to cover the bottom of the well and underlie the side walls, thus serving as their foundation. Upon this porous foundation-slab I place a layer of the porous terra-cotta blocks, each block being preferably the segment of a circle, and the blocks together forming a circle. The blocks are preferably cemented to the foundation-slab and to each other, so as to form water-tight joints. As a cement for this purpose, I prefer to use asphaltum applied hot. The application is made by lightly dipping the impinging surfaces of the blocks, after they have been fitted, into the hot asphaltum and quickly replacing them upon the slab and to one another before the asphaltum has time to cool. The walls of the well are then formed of these blocks laid one upon another, and all preferably fitted and cemented together, preferably with asphaltum, as before described, so as to form water-tight joints between the blocks.

Many of the advantages of my invention may be attained without making the joints of the walls or bottom absolutely water-tight, or by making them water-tight for only a portion of the depth of the walls; and I do not therefore limit myself to a structure in which all said joints are made water-tight.

The asphaltum forms a durable water-tight joint, and is not liable to crumble or decay, as are mortar or stone or earthy cements.

Wells bored by "augers" or otherwise, of dimensions too small to allow of walling in the manner above described, I line with tubes of the above-described porous terra-cotta, which may be made in sections or lengths convenient for handling—say twenty-four to thirty inches in length, more or less—and in diameter suited to the diameter of the hole made in the ground, the former preferably somewhat less than the latter.

With either the described porous tubing or the walls formed of the described blocks, gravel or clear coarse sand may be and preferably is introduced and packed into the space between the tube or wall and the surrounding earth, which serves both to support and hold this well-lining securely in place and to impede the entrance into the interstices of the porous terra-cotta of fine particles of dirt or dust, which might in time impair the filtering qualities of the lining. If preferred, a material having disinfective properties—such as coarsely-broken charcoal—may be used for this backing instead of sand.

The described lining for wells made of the said porous terra-cotta acts as a filter to exclude impurities and secure the introduction into wells of only pure water.

It is obvious that the described porous lining is equally applicable to and will serve the same purpose in reservoirs that are located in wet ground and the walls of which are not made water-tight.

I am aware that it is old to provide a well or cistern with a filtering apparatus made of porous earthenware, said apparatus being placed in the well containing water which passes into said filtering apparatus through the porous walls thereof, as shown in Patents Nos. 47,074 and 60,311, to Eduart Andries and W. H. Wiley, respectively, and what is therein shown and described I do not claim.

I am also aware that a composition of clay, sand, wood-sawdust, pulverized pumice-stone, and English calcimine, baked like pottery, has been used to construct filtering-vessels, (see Patent No. 217,970;) but this nor any other composition of matter I do not herein claim.

I am aware that it has been proposed to construct a cistern with a walling of burned clay, as shown in Patent No. 183,575, to J. Kennon, October 24, 1876; also, that it is not new to construct wells with walls of ordinary terra-cotta having the bottom or sides near the bottom perforated, as illustrated in Patents No. 129,314, to W. M. Campbell, July 16, 1872, No. 87,172, to W. T. Huntington, February 23, 1869, and No. 202,796, to J. Dollard, April 23, 1878; but the constructions shown in these several patents have nothing in common with my invention, since ordinary burned clay or ordinary terra-cotta is too dense for the purpose of filtering water in wells, and has to be perforated, as shown and described in the above-mentioned patents to Campbell, Huntington, and Dollard, to permit the passage of water from the surrounding earth into the same. The porous terra-cotta, on the other hand, is sufficiently porous to readily permit the passage of water therethrough and to effectually filter it in its passage. The advantage of the porous terra-cotta herein described over the ordinary terra-cotta described in the references is that the former is sufficiently porous to enable it to serve the purpose herein set forth, while the latter is not, and has to be perforated, as described in the several patents above mentioned.

The object of my invention is to construct the walls of a well of such material as will act to filter the water passing therethrough without perforating said walls, and this object is not accomplished by the patents hereinbefore mentioned.

What I claim as my invention, and desire to secure by Letters Patent, is—

1. A well built of porous terra-cotta, as distinguished from ordinary terra-cotta, for filtering the water passing into the same, substantially as described.

2. A well the walls and bottom of which are built of porous terra-cotta, as distinguished from ordinary terra-cotta, said porous walls and bottom serving to filter the water passing from the surrounding ground through the same into the well, substantially as described.

3. A well built of pieces of porous terra-cotta, as distinguished from ordinary terra-cotta, said pieces being united by asphaltum joints, so as to prevent the water from passing from the surrounding earth into the well, except through the porous material of which it is built, substantially as described.

CHARLES CARROLL GILMAN.

Witnesses:
HENRY MARKELL,
A. G. N. VERMILYA.